United States Patent
Lee et al.

(10) Patent No.: US 8,498,271 B2
(45) Date of Patent: Jul. 30, 2013

(54) METHOD OF AND APPARATUS FOR ADJUSTING QOS IN DATA TRANSMISSION OVER SCTP SESSION

(75) Inventors: Min-Ho Lee, Gwacheon-si (KR); Soo-Hong Park, Gwangju-si (KR); Young-Keun Kim, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1089 days.

(21) Appl. No.: 12/281,845

(22) PCT Filed: Feb. 27, 2007

(86) PCT No.: PCT/KR2007/000984
§ 371 (c)(1),
(2), (4) Date: Sep. 5, 2008

(87) PCT Pub. No.: WO2007/102664
PCT Pub. Date: Sep. 13, 2007

(65) Prior Publication Data
US 2009/0201886 A1 Aug. 13, 2009

(30) Foreign Application Priority Data
Mar. 7, 2006 (KR) .................. 10-2006-0021282

(51) Int. Cl.
*H04W 4/00* (2009.01)
(52) U.S. Cl.
USPC .......................... 370/332; 455/452.2
(58) Field of Classification Search
USPC ............... 370/332, 282, 329, 229, 248, 232, 370/235, 341–349, 410–474; 455/452.2, 455/453, 561; 709/200–217
See application file for complete search history.

(56) References Cited

U.S. PATENT DOCUMENTS

| | | | |
|---|---|---|---|
| 6,799,039 B2 | 9/2004 | Wu et al. | |
| 6,950,655 B2 | 9/2005 | Hunkeler | |
| 7,508,778 B2 * | 3/2009 | Yafuso | 370/282 |
| 7,751,824 B2 * | 7/2010 | Nonin et al. | 455/452.2 |
| 7,848,255 B2 * | 12/2010 | Suzuki et al. | 370/254 |
| 2004/0122981 A1 | 6/2004 | P. et al. | |
| 2006/0268784 A1 | 11/2006 | Lee et al. | |
| 2008/0205341 A1 | 8/2008 | Koh et al. | |

FOREIGN PATENT DOCUMENTS

| | | |
|---|---|---|
| KR | 2005-65982 | 6/2005 |
| KR | 10-2006-0121634 | 11/2006 |
| KR | 10-2006-0122538 | 11/2006 |

* cited by examiner

*Primary Examiner* — Chi Pham
*Assistant Examiner* — Alexander O Boakye
(74) *Attorney, Agent, or Firm* — Staas & Halsey LLP

(57) ABSTRACT

A method of adjusting quality of service (QoS) with respect to changes in a transmission environment of a mobile terminal receiving data based on a stream control transmission protocol (SCTP) session. When the transmission environment of the mobile terminal receiving data based on the SCTP session changes, the mobile terminal transmits link information indicating a new transmission environment to a destination node, and the destination node adjusts the quality of data or the size of a transmission window based on the link information. Thus, without adding separate network devices, the QoS of the data being transmitted can be adjusted with respect to the changed transmission environment, only by adding functions with software to the transmission terminal and the reception terminal. Also, since the destination node manually adjusts the transmission window according to the link information, packet loss can be minimized compared to the conventional congestion control method.

12 Claims, 6 Drawing Sheets

METHOD OF AND APPARATUS FOR ADJUSTING QOS IN DATA TRANSMISSION OVER SCTP SESSION

CROSS-REFERENCE TO RELATED APPLICATIONS

This application claims the benefit of PCT International Patent Application No. PCT/KR2007/000984, filed Feb. 27, 2007, and Korean Patent Application No. 2006-21282, filed Mar. 7, 2006, in the Korean Intellectual Property Office, the disclosures of which are incorporated herein by reference.

BACKGROUND OF THE INVENTION

1. Field of the Invention

Aspects of the present invention relate to wireless communication, and more particularly, to a method of and apparatus for receiving data in a mobile terminal using a stream control transmission protocol (SCTP).

2. Description of the Related Art

With the development of wireless communication technology, communication devices can now be used while users are on the move, in addition to using the communication devices at stationary locations. One of the most important technological factors to be considered when communicating while traveling is seamless connection to the Internet. In order to guarantee easy Internet connection, research on a variety of types of networks, such as a wireless local area network (WLAN) and a code division multiple access (CDMA) network, have been carried out. Even when a mobile terminal performing data communication moves into a heterogeneous network as well as a homogeneous network, if a mobile Internet protocol (IP) technology or a handover technology using an ADD IP of a stream control transmission protocol (SCTP) is used, the user can seamlessly and continuously maintain the communication connection.

However, since a variety of wireless networks have different available data transmission rates and billing systems, if the transmission environment of the user changes, a problem may arise.

FIG. 1 shows a problem occurring when a mobile terminal performs handover to a heterogeneous network according to conventional technology.

As shown in FIG. 1, a sender 20 is transmitting data to a mobile terminal 10. The mobile terminal 10, which belonged to an 802.11g wireless LAN 30, is moving to a service area of a CDMA network 40 while receiving the data. As described above, the user can continuously receive data using a handover technology. However, if the quantity of data transmitted by the sender 20 exceeds a range that can be covered by the CDMA network 40, a problem arises. The Internet tends to transmit as much data as possible, using available networks to the maximum (Best Effort Service). This tendency is stronger in multimedia services that should provide good sound and picture quality. Since the maximum data transmission rate supported in the CDMA network 40 is 2.4 Mbps, only 2.4 Mbps in the 10 Mbps data being transmitted by the sender 40 through the wireless LAN 30 is correctly transferred and 7.6 Mbps data is lost in the middle. Even though the existing session is maintained using a mobile IP, a case where normal service cannot be provided occurs.

In order to solve this problem, the sender 40 should adjust the transmission rate with respect to the transmission environment of the mobile terminal 30 and transmit data. However, so far, a method by which the sender 40 can recognize the network connection environment of the mobile terminal 10 has not been suggested.

When a mobile IP is used, a method by which link information of a reception terminal is inserted into a binding update option and then is transferred to a transmission terminal can be considered. However, if a new function is added when the mobile IP is used, all terminals and devices participating in the communication should provide related functions.

SUMMARY OF THE INVENTION

Aspects of the present invention provide an apparatus and method which allow the mobile terminal to receive data seamlessly with quality of service (QoS) optimized to a new transmission environment when the transmission environment of a mobile terminal receiving data using a stream control transmission protocol (SCTP) changes.

According to aspects of the present invention, a method of receiving data in a mobile node is provided. The method includes, generating information indicating a changed transmission environment if a transmission environment changes while data is being received; and transmitting the information to a destination node that is transmitting the data.

According to another aspect of the present invention, the data is transmitted based on a stream control transmission protocol (SCTP) session, and the transmitting of the information comprises transmitting an address configuration change (ASCONF) message including the information to the destination node.

According to another aspect of the present invention, the information includes at least one of a maximum available bandwidth, a signal-to-noise ratio (SNR), cost of network use, and the name of a network.

According to still another aspect of the present invention, a computer readable recording medium is provided, having embodied thereon a computer program to execute the method of adjusting quality of service (QoS).

According to another aspect of the present invention, a mobile terminal apparatus is provided. The mobile terminal apparatus includes a link information generation unit to generate information indicating a changed transmission environment if the transmission environment changes while data is being received; and a link information transferring unit transferring the information to a destination node that is transmitting the data.

According to another aspect of the present invention, a method of transmitting data is provided. The method includes receiving information indicating changes in a transmission environment where the mobile node is positioned while transmitting data to a predetermined mobile node; and adjusting the QoS of the data being transmitted based on the information.

According to another aspect of the present invention, the data is transmitted based on an SCTP session, and the receiving of the information indicating the changes in the transmission environment comprises receiving an ASCONF message including the information.

According to another aspect of the present invention, the adjusting of the QoS of the data comprises changing at least one of the quality of the data and a transmission window based on the information.

According to still another aspect of the present invention, a computer readable recording medium is provided, having embodied thereon a computer program to execute the method of transmitting data.

According to another aspect of the present invention, an apparatus to transmit data including: a link information reception unit to receive information indicating changes in a transmission environment where the predetermined mobile node is positioned, while transmitting data to a predetermined mobile node; and a QoS adjustment unit to adjust the QoS of the data being transmitted based on the information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
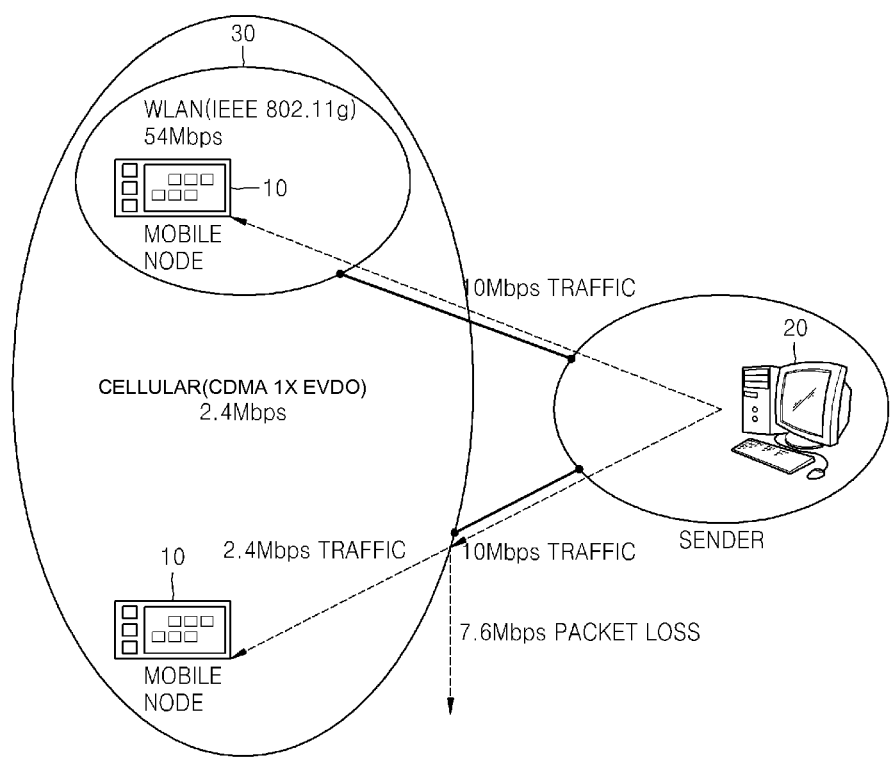
FIG. 1 illustrates a problem occurring when a mobile terminal performs handover to a heterogeneous network according to conventional technology.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
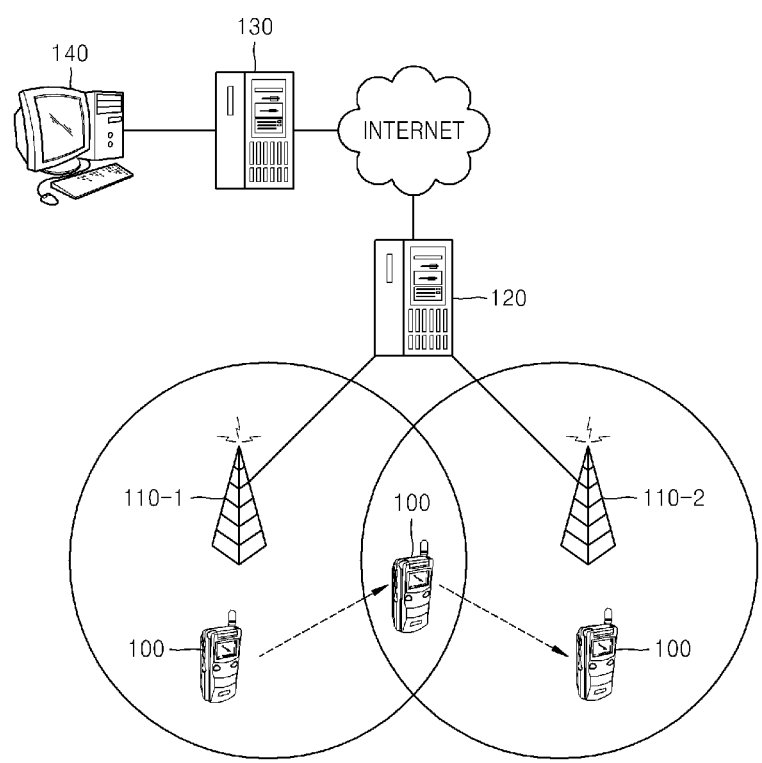
FIG. 2 illustrates a method of performing handover by a mobile terminal using a stream control transmission protocol (SCTP) according to an embodiment of the present invention.

FIG. 2 shows a process of performing handover by a mobile terminal using a stream control transmission protocol (SCTP) according to an embodiment of the present invention.

The SCTP basic standard defines that an IP address used in a session should be specified in advance in a session initialization operation. However, in an extended standard (m-SCTP, mobile SCTP), a function for registering or deleting a new IP address in a session in the middle of the session has been added. Hereinafter, the SCTP should be interpreted as a broader concept including the extended standard.

Referring to FIG. 2, the network includes a mobile terminal 100, IP-based base stations 110-1 and 110-2, a first router 120, a second router 130, and a terminal 140 at the other end.

The terminal 140 is a destination node to which the mobile terminal 100 transmits data. The mobile terminal 100 has a mounted SCTP protocol stack, and is assigned an IP address for communication by an IP-based base station 110-1 or 110-2 responsible for the area where the mobile terminal 100 is positioned. The IP-based base station 110-1 or 110-2 is positioned between the mobile terminal 100 which moved in the communication area for which the base station is responsible, and the first router 120, and relays a signal. The IP-based base station 110-1 or 110-2 transfers an SCTP data packet received from the mobile terminal 100 to the first router 120, and transfers an SCTP data packet with a destination being the mobile terminal 100 received from the first router 120 to the mobile terminal 100. The IP-based base station 110-1 or 110-2 transmits a beacon signal and assigns an IP address for communication to the mobile terminal 100 which moved into the communication area for which the base station is responsible.

The first router 120, which is connected to the Internet, transmits the SCTP data packet received from the IP-based base station 110-1 or 110-2 to the second router 130 responsible for the terminal 140, and transmits an SCTP data packet with a destination being the mobile terminal 100 to the IP-based base station 110-1 or 110-2 responsible for the area where the mobile terminal 100 is positioned. The second router 130 transmits the SCTP data packet received from the terminal 140 to the first router 120 responsible for the mobile terminal 100, and transfers the SCTP data packet to the terminal 140. The terminal 140 is an apparatus with a mounted SCTP protocol stack performing communication with the mobile terminal 100 according to the SCTP protocol.

Though an apparatus fixed to a predetermined place, such as a fixed server, is shown in FIG. 2, the terminal 140 may also be a mobile apparatus, such as a mobile phone, a personal digital assistant (PDA), or a notebook computer. The terminal 140 performs communication through routers and IP-based base stations.

In the network shown in FIG. 2, the mobile terminal 100 positioned in the area for which an IP-based first base station 110-1 is responsible establishes a communication route to the terminal 140 connected to the Internet. The mobile terminal 100 and the terminal 140 perform data communication through the established communication route. While performing the communication, if the mobile terminal 100 moves into the area for which an IP-based second base station 110-2 is responsible, the mobile terminal 100 senses a new link-up signal (for example, base station information included in a beacon signal) transmitted by the IP-based second base station 110-2, and a new IP address is assigned to the mobile terminal 100. The mobile terminal 100 can perform handover by adding the newly assigned IP address to the SCTP session.

When reconstruction of an IP address with respect to the SCTP session is required, the mobile terminal 100 loads related address information on an address configuration change (ASCONF) message and transmits the message to the terminal 140. In response to this, the terminal 140 transmits an ACSONF-ACK message. According to an aspect of the present invention, if the transmission environment of a mobile terminal is changed, the mobile terminal loads link information indicating the changed transmission environment onto an ASCONF message and transmits the message to the terminal 140. The terminal 140 receiving the ASCONF message adjusts the quality of data or transmission rate based on the link information included in the ASCONF message.

Figure 3:
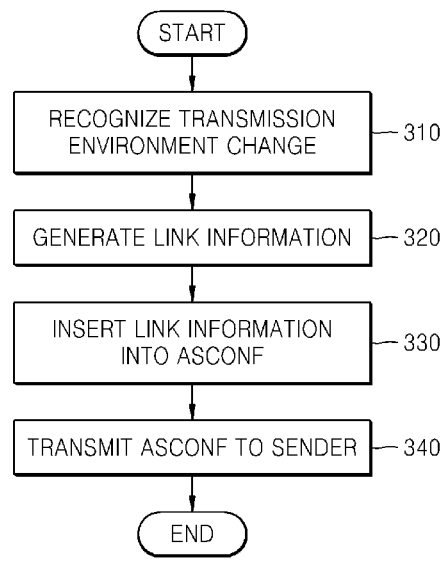
FIG. 3 is a flowchart of a process of providing link information to a terminal at the other end by a mobile terminal receiving data according to an embodiment of the present invention.

FIG. 3 is a flowchart of a process of providing link information to a terminal at the other end by a mobile terminal receiving data according to an embodiment of the present invention.

If a mobile terminal receiving data through an SCTP session recognizes that the transmission environment has changed in operation 310, the mobile terminal generates link information indicating the new transmission environment in operation 320. Changes in the transmission environment include all the changes in the maximum bandwidth that the mobile terminal can currently use, the name of the network to which the mobile terminal belongs, and the billing system for use of the network.

There may be a variety of reasons for these changes in the transmission environment. The reason may be a handover to a network of a type different from that of the network to which the mobile terminal previously belonged (vertical handover) or a handover to a network of the same type of the network to which the mobile terminal previously belonged (horizontal handover) when the mobile terminal moves. Even if the position of the mobile terminal does not change, if the number of terminals accessing the same subnet that the mobile terminal accesses increases and thus the maximum available bandwidth decreases, this can be regarded as a change in the transmission environment.

The generated link information is inserted into an ASCONF message in operation 330. The ASCONF message is transmitted to a terminal at the other end which is transmitting the data in operation 340. The ASCONF message is a message used to change IP settings, for example, adding or deleting a new IP in an SCTP session, as described above.

If the transmission environment is changed as the number of terminals accessing the same subnet that the mobile terminal accesses increases and thus the maximum available bandwidth decreases even though the position of the mobile terminal does not change, the changes such as adding or deleting an IP address may not be needed. Accordingly, an ASCONF message with a format allowing a currently used IP to be redundantly added can be used so that the existing IP settings cannot be changed.

Figure 4:
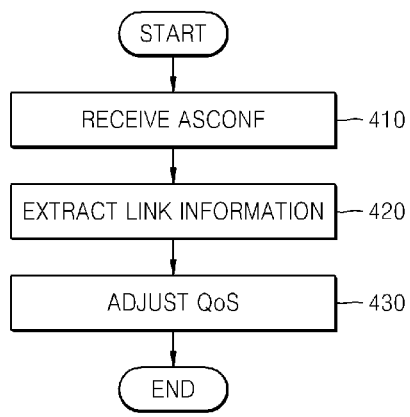
FIG. 4 is a flowchart of a process of adjusting quality of service (QoS) by a terminal transmitting data according to an embodiment of the present invention.

FIG. 4 is a flowchart of a process of adjusting quality of service (QoS) by a terminal transmitting data according to an embodiment of the present invention.

When a terminal transmitting data to a mobile terminal through an SCTP session receives an ASCONF message from the mobile terminal in operation 410, the terminal extracts link information in operation 420. An operation for changing an IP address setting according to the contents of the ASCONF message, not shown, may also be performed. The terminal adjusts the QoS of the data being transmitted in operation 430 according to the extracted link information. The adjustment here may be adjustment of the quality of data or the size of a transmission window.

For example, when the mobile terminal moves from a wireless LAN to a CDMA network supporting a bandwidth lower than that of the wireless LAN, while receiving data (such as moving pictures) in real time, the terminal at the other end transmitting the moving picture data may transmit the data after lowering the quality of the moving picture data. In the case of non real-time data, it may be more important to transmit the data without errors though the speed may be a little lower than that for real-time transmission, and thus the size of the transmission window may be adjusted appropriately. In some cases, the two adjusting techniques can be used together, or other techniques may be employed.

If the mobile terminal moves from a CDMA network to a wireless LAN supporting a bandwidth higher than that of the CDMA, while receiving data in real time, the terminal at the other end transmitting the moving picture data may transmit the data after increasing the quality of the moving picture data. Likewise, also in the case of non real-time data, it may be helpful to increase a transmission rate per unit time by adjusting the size of the transmission window in respect of enhancement of satisfaction about services. The two adjusting techniques may also be used together.

The link information that is a criterion for adjusting the QoS can include a maximum available bandwidth, a signal-to-noise ratio (SNR), cost for network use, and the name of a network, as described above. The terminal transmitting data may also adjust the QoS with respect to the cost for network use in addition to or instead of the maximum bandwidth or the SNR indicated by the link information. For example, if the transmission cost per packet of a network where the mobile terminal is positioned is lower than a threshold price preset by a user, moving pictures of a highest picture quality is transmitted, or else the QoS can be adjusted so that the transmission cost does not exceed the threshold price. Also, when only network names, such as 802.11b, and CDMA 1xEV-D0, are included in the link information, information on a maximum bandwidth provided by each network may be learned in advance. By determining, for example, 60% of the maximum bandwidth as an optimum transmission rate, a transmission window can be adjusted to the optimum transmission rate.

Figure 5:
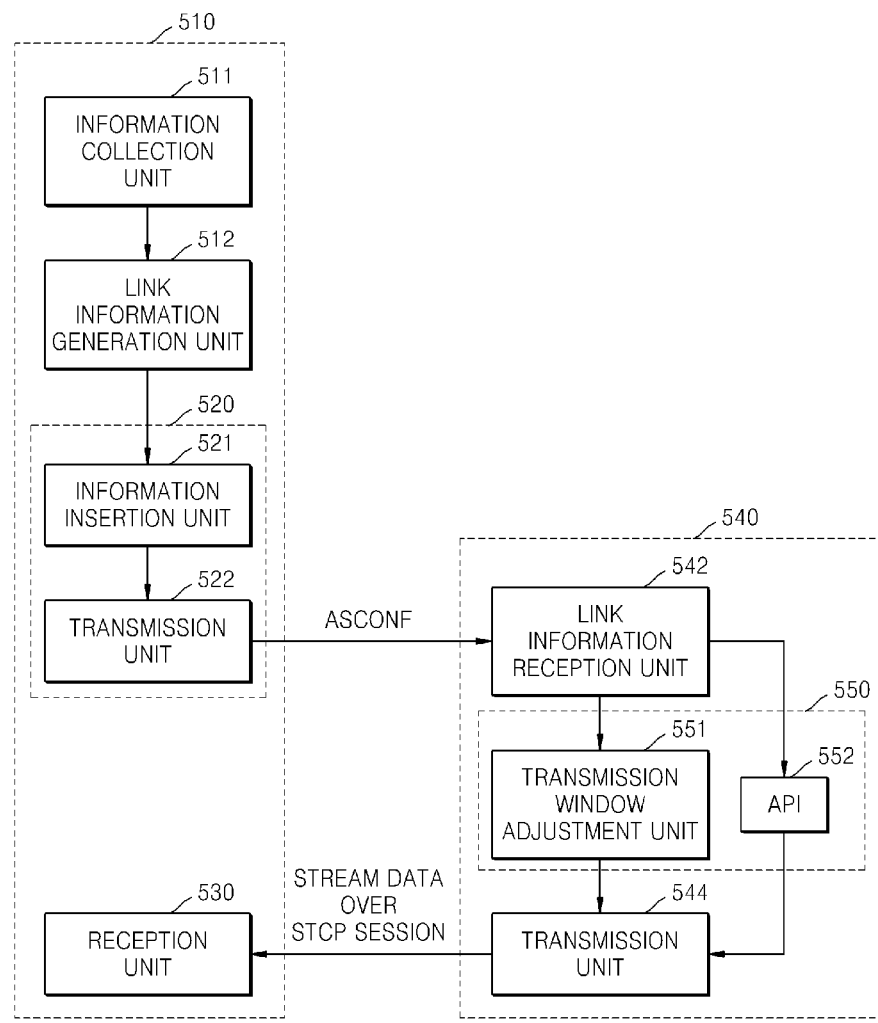
FIG. 5 illustrates a structure of a mobile node transferring link information to a terminal at the other end and a structure of the terminal at the other end adjusting QoS based on the transferred link information according to an embodiment of the present invention.

FIG. 5 shows a structure of a mobile node 510 transferring link information to a terminal 540 at the other end and a structure of the terminal 540 at the other end adjusting QoS based on the transferred link information according to an embodiment of the present invention.

Referring to FIG. 5, the mobile terminal 501 includes an information collection unit 511, a link information generation unit 512, a link information transferring unit 520, and a reception unit 530. The link information transferring unit 520 includes an information insertion unit 521 and a transmission unit 522. According to other aspects of the present invention, the mobile terminal 501 may include additional and/or different units. Similarly, the functionality of two or more of the above units may be integrated into a single component.

When the transmission environment is changed, the information collection unit 511 receives a message from a base station or an access point, and thus collects information on the new transmission environment. The link information generation unit 512 generates link information indicating the new transmission environment based on the information collected by the information collection unit 511. The link information transferring unit 520 transmits the generated link information to a terminal 540 at the other end. The link information transferring unit 520 includes the information insertion unit 521 and the transmission unit 522. The information insertion unit 521 inserts the link information generated in the link information generation unit 521 into an ASCONF message, and the transmission unit 522 transmits the ASCONF message into which the link information is inserted, to the terminal 540. The reception unit 530 receives stream data from the terminal 540 through an SCTP session.

The terminal 540 is composed of a link information reception unit 542, a QoS adjustment unit 550, and a transmission unit 544. The link information reception unit 542 receives an ASCONF message including link information indicating a transmission environment in which the mobile terminal 510 is positioned, and transfers the ASCONF message to the QoS adjustment unit 550. The QoS adjustment unit 550 includes a transmission window adjustment unit 551 and an application programming interface (API) 552. The transmission window adjustment unit 551 adjusts the size of a transmission window based on link information. The API 552 transfers link information to an application, which determines the quality of data being transmitted, so that the quality of the data being transmitted can be changed to a quality optimal to the current transmission environment of the mobile terminal 510. The transmission unit 544 transmits stream data to the mobile terminal 510 with the QoS determined by the QoS adjustment unit 550.

Figure 6A:
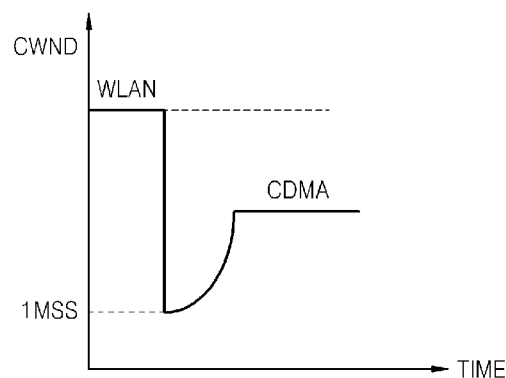
FIGS. 6A and 6B illustrate an effect of reducing packet loss by adjustment of a transmission window according to an embodiment of the present invention, compared to conventional congestion control.
Figure 6B:
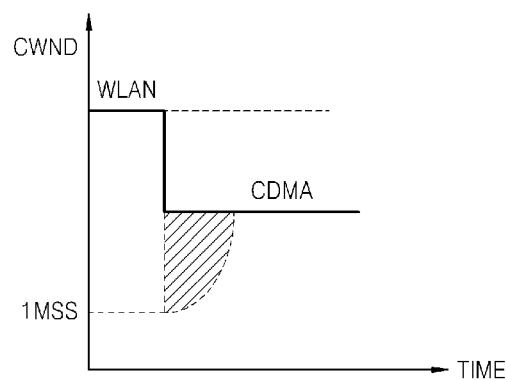

FIGS. 6A and 6B shows the effect of reducing packet loss by adjustment of a transmission window according to an embodiment of the present invention, compared to conventional congestion control. In this example, it is assumed that while receiving data in a wireless LAN, a mobile terminal changes the position and handover is performed from the wireless LAN to a CDMA network having a lower available bandwidth. FIG. 6A is a graph showing changes in the size of a transmission window according to a conventional congestion control technology in the TCP or SCTP protocol. As shown in FIG. 6A, as a mobile terminal receiving data through a wireless LAN moves away from an access point, a terminal at the other end cannot receive an ACK for a packet transmitted to the mobile terminal in a predetermined time. If a time out occurs, the size of the existing transmission window is reset to 1 maximum segment size (MSS). The size of the transmission window after that time is adjusted to a size suitable for a CDMA network in a pattern shown in FIG. 6A by a slow start mechanism.

FIG. 6B is a graph showing changes in the size of a transmission window when the QoS is adjusted according to an embodiment of the present invention. According to the current embodiment, a mobile terminal performing a handover from a wireless LAN to a CDMA network transmits link information on the CDMA network at an overlapping area of the two networks, to a terminal at the other end.

Accordingly, the terminal at the other end does not reset the size of the transmission window to 1 MSS and immediately adjusts the size to an appropriate level, as shown in FIG. 6B. In this way, the process according to aspects of the present invention can reduce the same packet loss as much as the shaded part compared to the conventional method.

Figure 7A:
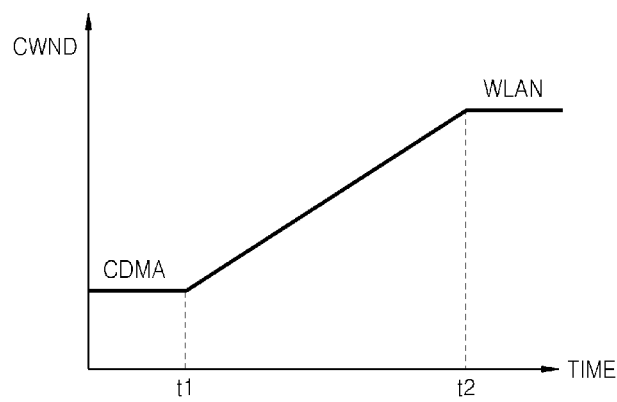
FIGS. 7A and 7B illustrate an effect of improving a transmission rate by adjustment of a transmission window according to an embodiment of the present invention, compared to conventional congestion control.
Figure 7B:
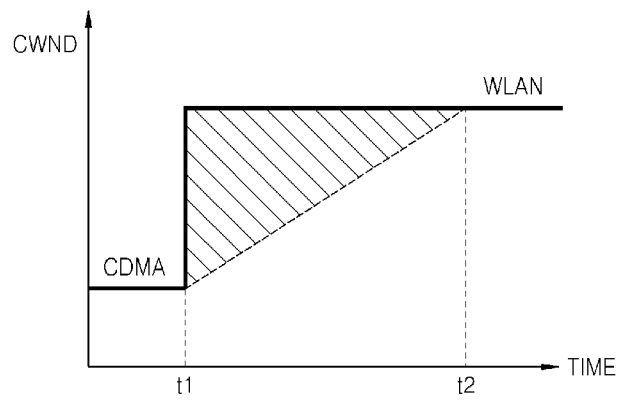

FIGS. 7A and 7B show the effect of improving a transmission rate by adjustment of a transmission window according to an embodiment of the present invention, compared to conventional congestion control.

Hereinafter, it is assumed that while receiving data in a CDMA network, a mobile terminal changes position and handover is performed from the CDMA network to a wireless LAN having a higher available bandwidth.

FIG. 7A is a graph showing changes in the size of a transmission window according to a conventional congestion control technology in the TCP or SCTP protocol. As shown in FIG. 7A, as a mobile terminal receiving data through a CDMA network approaches a wireless LAN access point, if a handover from the CDMA network to the wireless LAN is performed, the size of the transmission window gradually increases until the transmission rate reaches a level suitable for the wireless LAN (Additive Increase). Referring to FIG. 7A, the handover from the CDMA network to the wireless LAN begins at a time point t1, and the size of the transmission window becomes to fit the transmission rate of the wireless LAN at a time point t2.

FIG. 7B is a graph showing changes in the size of a transmission window according to an embodiment of the present invention. According to the current embodiment, a mobile terminal which is to perform a handover from a CDMA network to a wireless LAN transmits link information on the wireless LAN to a terminal at the other end immediately before the handover is performed. Accordingly, the terminal at the other end does not gradually increase the size of the transmission window from the time point t1 to the time point t2, and manually adjusts the size to a level suitable for the wireless LAN immediately as illustrated in FIG. 7B.

In this way, the method according to aspects of the present invention can improve the transmission rate as much as the shaded part compared to the conventional method shown in FIG. 7A.

Aspects of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CDs, DVDs, Blu-ray discs, magnetic tapes, floppy disks, and optical data storage devices. Aspects of the present invention may also be embodied as carrier waves (such as data transmission through the Internet).

According to aspects of the present invention, without adding separate network devices, and only by adding a function to the mobile terminal and the terminal at the other end using software, the QoS of the data being transmitted can be adjusted with respect to a changed transmission environment when the transmission environment of the mobile terminal receiving the data is changed.

According to additional aspects of the present invention, in congestion control, a mobile terminal transmits link information indicating a changed transmission environment to a terminal at the other end, and thus the terminal at the other end can manually adjust the transmission size immediately such that packet loss can be minimized.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A method of receiving data in a mobile node, comprising:
   generating information indicating a changed transmission environment if a transmission environment changes while the data is being received; and
   transmitting the information to a node that is transmitting the data to the mobile node,
   wherein the data is transmitted based on a stream control transmission protocol (SCTP) session, and the transmitting of the information comprises transmitting an address configuration change (ASCONF) message including the information to the destination node.

2. The method of claim 1, wherein the information comprises at least one of a maximum available bandwidth, a signal-to-noise ratio (SNR), cost of network use, and the name of a network.

3. A non-transitory computer readable recording medium having embodied thereon a computer program to execute the method of claim 1.

4. A mobile terminal apparatus comprising:
   a link information generation unit to generate information indicating a changed transmission environment if the transmission environment changes while data is being received; and
   a link information transferring unit to transfer the information to a node that is transmitting the data to the mobile node, wherein:

the data is transmitted based on a SCTP sessions; and the link information transferring unit comprises:

an information insertion unit to insert the information into the ASCONF message; and a transmission unit to transmit the ASCONF message into which the information is inserted to the destination node.

5. The apparatus of claim 4, wherein the information comprises at least one of a maximum available bandwidth, signal-to-noise ratio (SNR), a cost of network use, and the name of a network.

6. A method of transmitting data, comprising:

receiving information indicating changes in a transmission environment from a predetermined mobile node where the predetermined mobile node is positioned while transmitting data to the predetermined mobile node; and based on the information, adjusting the quality of service (QoS) of the data being transmitted, wherein:

the data is transmitted based on an SCTP session; and the receiving of the information indicating the changes in the transmission environment comprises receiving an ASCONF message including the information.

7. The method of claim 6, wherein the adjusting of the QoS of the data comprises changing at least one of the quality of the data and a transmission window based on the information.

8. The method of claim 6, wherein the information comprises at least one of a maximum available bandwidth, signal-to-noise ratio (SNR), cost of network use, and the name of a network.

9. A non-transitory computer readable recording medium having embodied thereon a computer program to execute the method of claim 6.

10. An apparatus to transmit data, comprising:

a link information reception unit, to receive information indicating changes in a transmission environment from a predetermined mobile node where the predetermined mobile node is positioned while transmitting the data to a predetermined mobile node; and a quality-of-service (QoS) adjustment unit to adjust the QoS of the data being transmitted based on the information, wherein:

the data is transmitted based on an SCTP session, and the link information reception unit receives an ASCONF message including the information from the mobile node.

11. The apparatus of claim 10, wherein the QoS adjustment unit comprises:

an API unit to transfer the information to an application adaptively changing the quality of data being transmitted according to the information; and a transmission window adjustment unit to adaptively change the transmission window of the data according to the information.

12. The apparatus of claim 10, wherein the information comprises at least one of a maximum available bandwidth, an SNR, cost of network use, and the name of a network.

* * * * *